(12) United States Patent
Frisk et al.

(10) Patent No.: US 6,733,841 B2
(45) Date of Patent: May 11, 2004

(54) HYDROPHILIC TREATMENT OF A CARBON FIBER CONSTRUCTION

(76) Inventors: Joseph William Frisk, P.O. Box 33427, St. Paul, MN (US) 55133-3427; Wayne Meredith Boand, P.O. Box 33427, St. Paul, MN (US) 55133-3427

( * ) Notice: Subject to any disclaimer, the term of this patent is extended or adjusted under 35 U.S.C. 154(b) by 193 days.

(21) Appl. No.: 09/999,561

(22) Filed: Nov. 1, 2001

(65) Prior Publication Data

US 2003/0082374 A1 May 1, 2003

(51) Int. Cl.⁷ .................................................. B05D 3/02
(52) U.S. Cl. ..................... 427/394; 427/384; 427/372.2; 427/430.1; 427/443.2; 442/118; 442/172; 442/179; 106/12; 106/287.17; 106/287.19; 106/287.34
(58) Field of Search ................................ 427/372.2, 384, 427/394, 430.1, 443.2; 442/118, 172, 179; 423/414, 445 R, 447.1, 447.2, 460; 106/12, 287.17, 287.18, 287.19, 287.34, 287.35

(56) References Cited

U.S. PATENT DOCUMENTS 5,527,599 A * 6/1996 Hall et al.
5,840,414 A 11/1998 Bett et al.
5,998,058 A 12/1999 Fredley
6,024,848 A 2/2000 Dufner et al.

FOREIGN PATENT DOCUMENTS

WO  WO 94/29640  12/1994

* cited by examiner

*Primary Examiner*—Deborah Jones
*Assistant Examiner*—Wendy Boss
(74) *Attorney, Agent, or Firm*—Philip Y. Dahl

(57) ABSTRACT

A method is provided for making a hydrophilic carbon fiber construction comprising the steps of: a) immersing a carbon fiber construction in an aqueous dispersion of one or more metal oxides, comprising: i) 1–15% by weight metal oxide; ii) 0.01%–5% by weight dispersant; and b) subsequently heating the carbon fiber construction sufficiently to remove substantially all of the dispersant. Typically the entire method can be completed in less than 20 minutes. In addition, a hydrophilic carbon fiber construction made according to the method of the present invention is provided, typically having a loading of metal oxide equivalent to 20–50 mg metal per gram of carbon.

25 Claims, 4 Drawing Sheets

HYDROPHILIC TREATMENT OF A CARBON FIBER CONSTRUCTION

FIELD OF THE INVENTION

This invention relates to a method of making a hydrophilic carbon fiber construction by immersing a carbon fiber construction in an aqueous dispersion of a metal oxide comprising: i) 1–15% by weight metal oxide and ii) 0.01%–5% by weight dispersant; followed by heating the carbon fiber construction to remove the dispersant.

BACKGROUND OF THE INVENTION

U.S. Pat. No. 5,840,414 discloses a carbon plate for use in a fuel cell system which is rendered hydrophilic by incorporation of a metal oxide. The reference lists potential methods at col. 5, lines 31–52. The reference describes in detail and exemplifies a three-step method of incorporating metal oxide in a graphite plate by treatment with a metal chloride, in situ conversion of the metal chloride to metal hydroxide, and in situ conversion of the metal hydroxide to metal oxide. (col 5, line 53–col. 6, line 21; and col. 7, lines 7–25).

U.S. Pat. No. 5,998,058 discloses an electrode backing layer for a polymer electrolyte membrane fuel cell formed from a carbon fiber substrate treated so as to contain both "hydrophilic" and "hydrophobic" pores. The reference describes a method of making pores more hydrophilic by immersion in a solution of tin tetrachloride pentahydrate followed by immersion in ammonia.

U.S. Pat. No. 6,024,848 discloses a porous support plate for an electrochemical cell which includes a contact bilayer adjacent to an electrode including a hydrophobic and a hydrophilic phase. The reference discloses a hydrophilic phase comprised of a mixture of carbon black and a proton exchange resin.

SUMMARY OF THE INVENTION

Briefly, the present invention provides a method of making a hydrophilic carbon fiber construction comprising the steps of: a) immersing a carbon fiber construction in an aqueous dispersion of one or more metal oxides, comprising: i) 1–15% by weight metal oxide; ii) 0.01%–5% by weight dispersant; and b) subsequently heating the carbon fiber construction sufficiently to remove substantially all of the dispersant. Typically the aqueous dispersion contains 1–5% by weight metal oxide, more typically 1–3% by weight metal oxide and more typically 1.5–2.5% by weight metal oxide. Typically the metal oxide is selected from oxides of Sn, Si, Zr, Ti, Al, and Ce, most typically $SnO_2$. Typically the dispersant is a non-ionic dispersant such as an alcohol alkoxylate such as Triton™ X100. Typically the immersion step can be completed in less than 30 minutes, more typically in less than 10 minutes, and most typically in less than 1 minute. Typically the entire method can be completed in less than 30 minutes, more typically in less than 20 minutes, most typically in less than 5 minutes.

In another aspect, the present invention provides a hydrophilic carbon fiber construction made according to the method of the present invention, typically having a loading of metal oxide equivalent to 20–50 mg metal per gram of carbon.

What has not been described in the art, and is provided by the present invention, is a simple and speedy method of making a hydrophilic carbon fiber construction impregnated with a uniform coating of a metal oxide.

In this application the terms "surfactant" and "dispersant" are used interchangeably.

It is an advantage of the present invention to provide a simple and speedy method, typically taking approximately 15 minutes, for making a hydrophilic carbon fiber construction impregnated with a uniform coating of a metal oxide, which is useful as an electrode backing layer or gas diffusion layer in an electrolytic cell such as a fuel cell. It is an advantage of the present invention that it requires no vacuum source to wet out the treated substrate. It is an advantage of the present invention that it requires only a single liquid immersion tank. It is an advantage of the present invention that it requires no monitoring or addition of chemicals during treatment. It is an advantage of the present invention that it avoids the use of chemicals as toxic and corrosive as tin tetrachloride pentahydrate, used in some prior art processes.

DETAILED DESCRIPTION OF PREFERRED EMBODIMENTS

Figure 1:
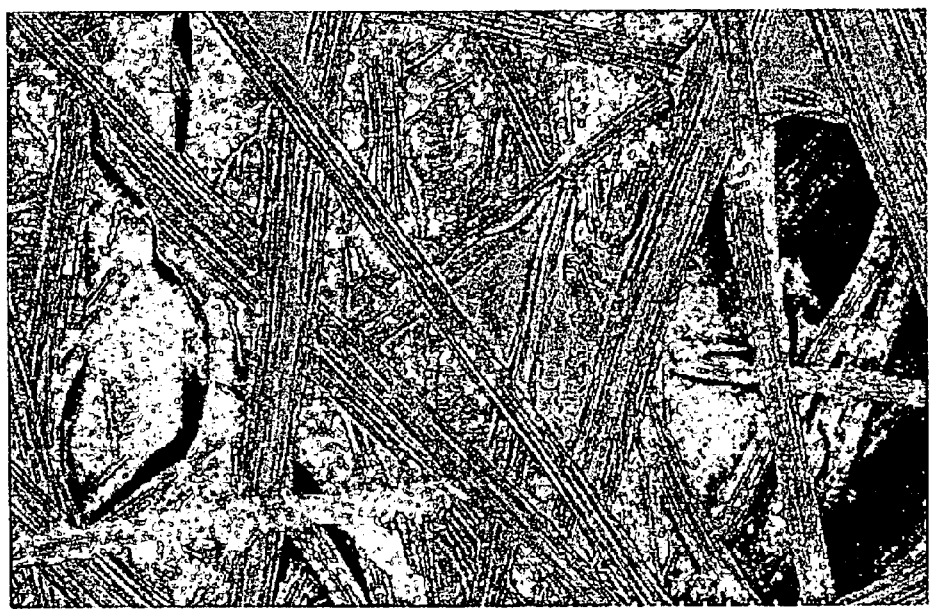
FIG. 1 is an electron micrograph at a magnification of 500× of a sample of Toray Carbon Paper 060 treated according to the present invention with $SnO_2$.

The present invention provides a method of making a hydrophilic carbon fiber construction comprising the steps of: a) immersing a carbon fiber construction in an aqueous dispersion of one or more metal oxides, comprising: i) 1–15% by weight metal oxide; ii) 0.01%–5% by weight dispersant; and b) subsequently heating the carbon fiber construction sufficiently to remove substantially all of the dispersant.

Typically the metal oxide is selected from oxides of Sn, Si, Zr, Ti, Al, and Ce. Most typically the metal oxide is $SnO_2$. Typically the aqueous dispersion contains 1–5% by weight metal oxide, more typically 1–3% by weight metal oxide and more typically 1.5–2.5% by weight metal oxide. As Example 3 demonstrates, infra, the relationship of the mass loading of metal in the hydrophilic carbon fiber construction to the wt % of metal oxide in the treatment dispersion is an approximately linear function for dispersions in the regions of 0.5 to 2.5 weight % metal oxide and 2.5 to 15 weight % metal oxide. Typically the hydrophilic carbon fiber construction according to the present invention has a loading of metal oxide equivalent to 20–50 mg metal per gram of carbon. In particular, where the metal oxide is SnO$_2$, the hydrophilic carbon fiber construction according to the present invention typically has a loading of SnO$_2$ equivalent to 20–50 mg Sn per gram of carbon. Metal oxide particle size is typically less 1000 nm, more typically less than 100 nm, more typically less than 40 nm, and most typically less than 20 nm.

Any suitable dispersant that can be removed in the heating step may be used. Advantageously the dispersant is one which will not adversely affect the activity of a fuel cell catalyst such as a platinum catalyst. Suitable non-ionic, anionic, cationic and amphoteric dispersants may be used. Typically the dispersant is non-ionic or contains substantially only non-metallic counterions such as ammonium ions. Most typically the dispersant is non-ionic. Non-ionic dispersants which may be useful in the practice of the present invention may include: alcohol alkoxylates such as Triton™ X100, Tomadyne™ 101LF, Iconol™ TDA6 Iconol™ TDA9 Triton™ DF-12; amine alkoxylates such as Varonic™ K-205; alkyl glucosides such as Glucpon™ 425; alkanolamides; amine oxides such as Tomah Products "AO-14-2" (dihydroxyethylisodecyloxypropyl amine oxide), Ninox™ M (myristyl amine oxide) and Varonic™ K-205 (cocoamine ethoxylate).

Quaternary amine salts useful as surfactants of this invention are those within general formula (I):

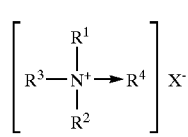

wherein R1 and R2 are the same or different and are selected from the group consisting of alkyl and substituted alkyl groups, R3 is selected from the group consisting of straight chain alkyls, branched chain alkyls, straight chain heteroalkyls, and branched chain heteroalkyls having from about 10 to 20 carbon atoms, R4 is selected from the group consisting of alkyl groups having from 1 to about 5 carbon atoms (preferably methyl), and X is a halogen atom, preferably atomic chlorine. Examples of quaternary amine salts are "Q-17-5" (isotridecyloxypropyl poly(5) oxyethylene methyl ammonium chloride, and "Q-S-80" (mono soya ammonium chloride quaternary), both available from Tomah Products, Inc., Milton, Wis.

Amphoteric surfactants include alkylamidopropyl dimethylbetaines such as Tego Betaine™ L 7 (Goldschmidt), alkylamidobetaines such as Incronam™ 30 (Croda), imidazoline derivatives such as Chimexane™ HD (Chimex), N-alyl-beta-iminodipropionates such as Monateric™ ISA 35 (Mona).

Most typically the dispersant is a non-ionic dispersant, most typically an alcohol alkoxylate.

Typically the treatment dispersion contains 0.01%–5% by weight non-ionic dispersant, more typically 0.01%–1% by weight and most typically 0.01%–1% by weight.

Any suitable carbon fiber construction may be used. Typically the carbon fiber construction is selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like.

Typically the immersion step is completed in less than 30 minutes, more typically in less than 10 minutes, and more typically less than 1 minute. Typically the entire method is completed in less than 30 minutes, more typically in less than 20 minutes, and most typically about 15 minutes. In an automated, continuous process times of less than 5 minutes are typical and times of less than 2 minutes can be achieved.

In addition, the present invention provides a hydrophilic carbon fiber construction made according to the method of the present invention. Hydrophilic carbon fiber constructions made according to the method of the present invention advantageously have a high degree of uniformity in distribution of metal oxide, as illustrated by comparison of FIGS. 1 and 2. Typically the hydrophilic carbon fiber construction made according to the present invention has a loading of metal oxide equivalent to 20–50 mg metal per gram of carbon. In particular, where the metal oxide is SnO$_2$, the hydrophilic carbon fiber construction made according to the present invention typically has a loading of SnO$_2$ equivalent to 20–50 mg Sn per gram of carbon.

This invention is useful in providing a hydrophilic carbon fiber construction useful as an electrode backing layer or gas diffusion layer in an electrolytic cell such as a fuel cell.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Treatment Method

Nyacol® SN15CG SnO$_2$ dispersion (Nyacol Nano Technologies, Inc., Ashland, Mass.) was used for all SnO$_2$ dispersions. The dispersion as received contains 15 weight % SnO$_2$. Dispersion pH is 10.0 and SnO$_2$ particle size is 10–15 nm. Lower SnO$_2$ content dispersions were made by the addition of deionized water. After dilution, a trace amount of non-ionic surfactant was added to each SnO$_2$ dispersion. The non-ionic surfactant was Triton™ X100 (Union Carbide Corp., Danbury, Conn.).

The porous carbon fiber substrate was selected from Toray™ Carbon Paper 060 (Toray International Inc., Tokyo, Japan) and SpectraCarb™ Carbon Paper (Spectracorp, Lawrence, Mass.). Samples of the porous carbon fiber substrate were immersed in a SnO$_2$/surfactant dispersion for 5 seconds and hung up to dry.

The carbon fiber substrate was then heat treated to remove surfactant by heating the substrate to 380° C. for 10 minutes.

Example 1

Samples of Toray Carbon Paper 060 were treated as described above using two different dispersions, 2.5 weight % SnO$_2$ and 15.0 weight % SnO$_2$, and compared to untreated Toray Carbon Paper 060. The sample of untreated Toray paper did not wick water. The sample that were treated with SnO$_2$ readily wicked water.

Example 2

Figure 2:
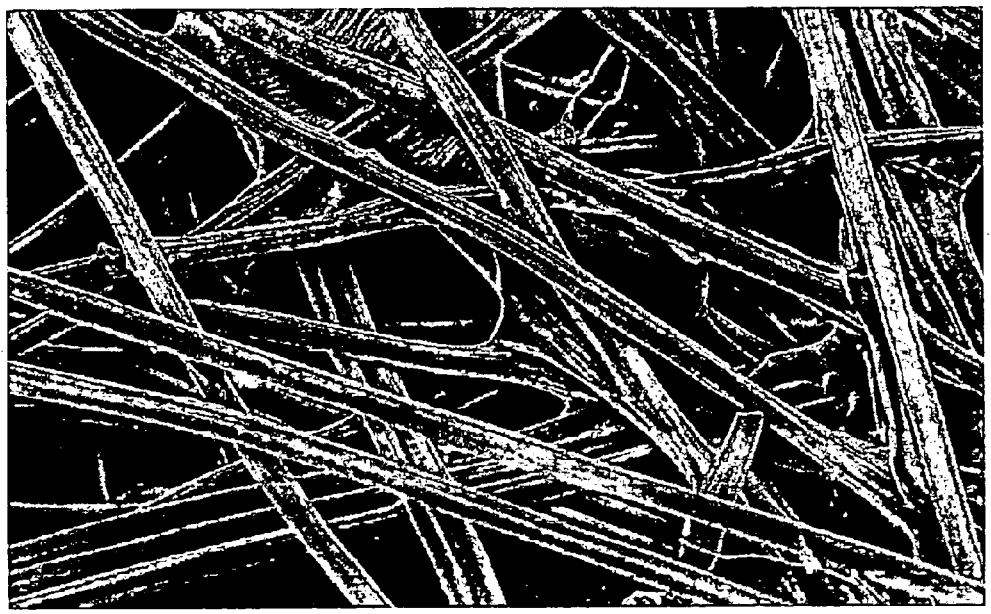
FIG. 2 is an electron micrograph at a magnification of 500× of a comparative sample of untreated Toray Carbon Paper 060.

A sample of Toray Carbon Paper 060 was treated as described above using a 2.15 weight % SnO$_2$ dispersion and compared with untreated Toray Carbon Paper 060 by electron microscopy. FIG. 1 is an electron micrograph of the sample that treated with 2.15 weight % SnO$_2$ at a magnification of 500× and FIG. 2 is an electron micrograph of the untreated sample at a magnification of 500×.

Example 3

This Example demonstrates the relationship of final loading of $SnO_2$ on the carbon fiber substrate to the weight % of $SnO_2$ in the dispersion. Samples of dispersion were made at the following concentrations by the addition of DI water: 0.5, 1.0, 1.5, 1.9, 2.0, 2.5, 3.6, 7.2, and 15 wt %.

Figure 3:
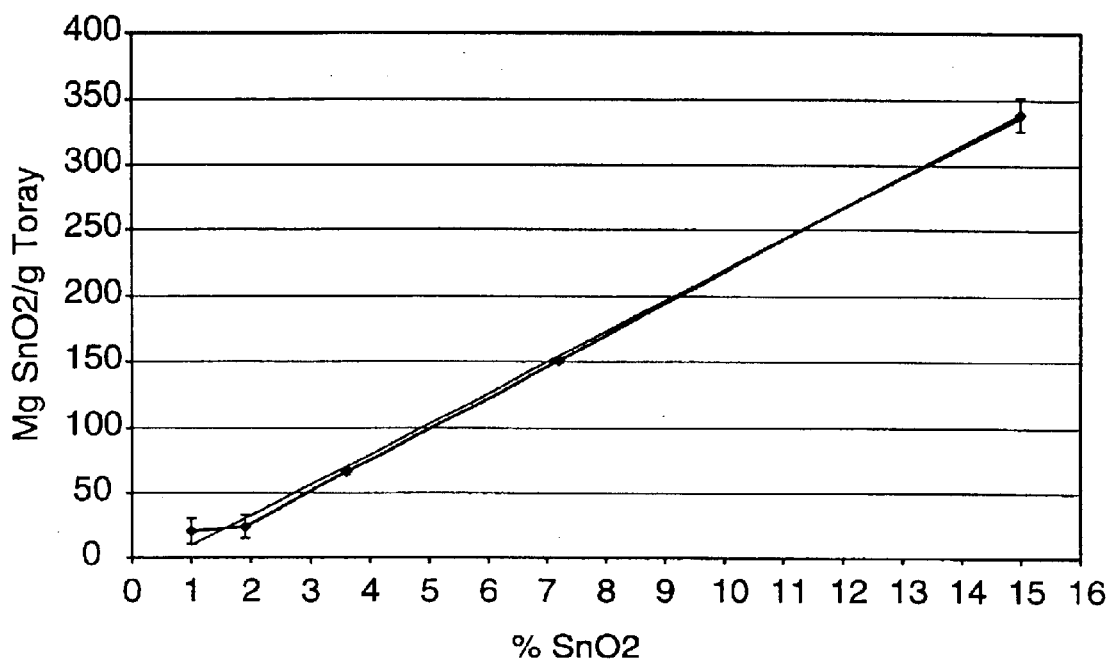
FIG. 3 is a graph of $SnO_2$ mass loading for carbon fiber substrates treated according to the present invention as a function of wt % of $SnO_2$ in the treatment dispersion.
Figure 4:
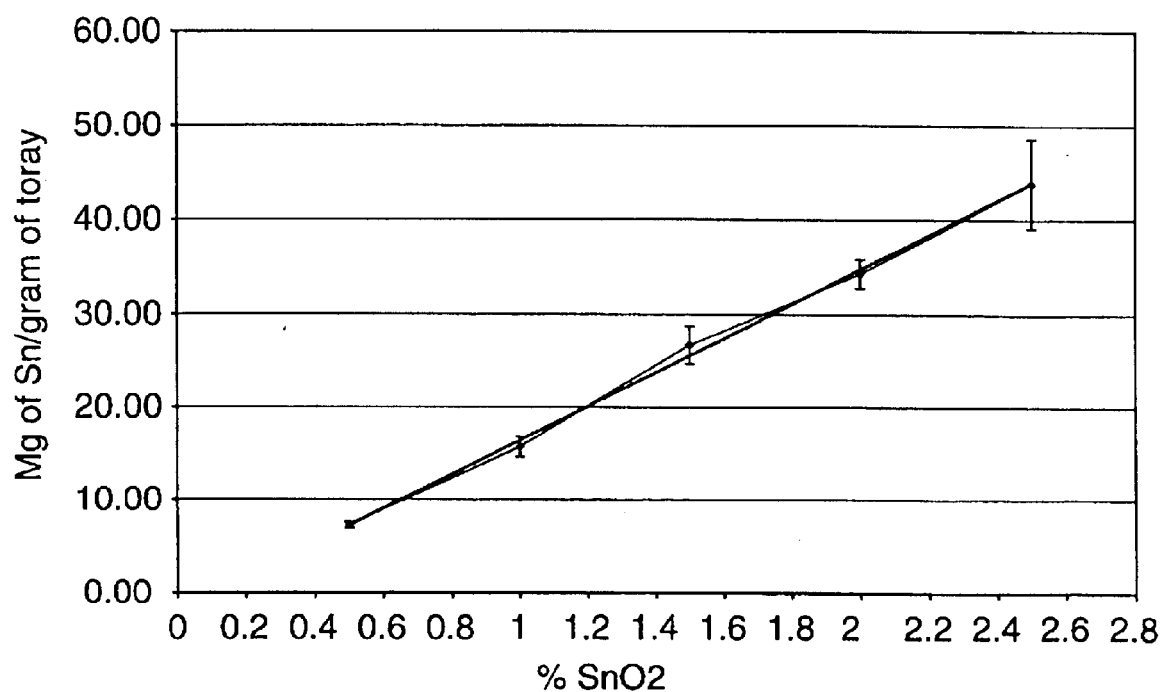
FIG. 4 is a graph of $SnO_2$ mass loading for carbon fiber substrates treated according to the present invention as a function of wt % of $SnO_2$ in the treatment dispersion.

Samples of Toray Carbon Paper 060 were treated as described above and then die cut to 5.10 cm diameter circles and weighed. FIGS. 3 and 4 are graphs demonstrating the relationship of $SnO_2$ mass loading as a function of wt % of $SnO_2$ in the treatment dispersion, which is approximately linear for dispersions in the regions of 0.5 to 2.5 weight % $SnO_2$ and 2.5 to 15 weight % $SnO_2$.

Example 4

Samples of SpectraCarb Carbon Paper were treated as described above with $SnO_2$ dispersions at the following concentrations: 2.0, 4.0, 8.0 and 15 weight % $SnO_2$. Each sample was measured for rate of water absorption using deionized water and a Fibro Dat contact angle instrument (model Fibro Dat 100, Fibro Systems AB, Hagersten, Sweden). The following control samples were also measured: untreated SpectraCarb, untreated Toray Carbon Paper 060, and a dense piece of acetate was also measured as a control.

Figure 5:
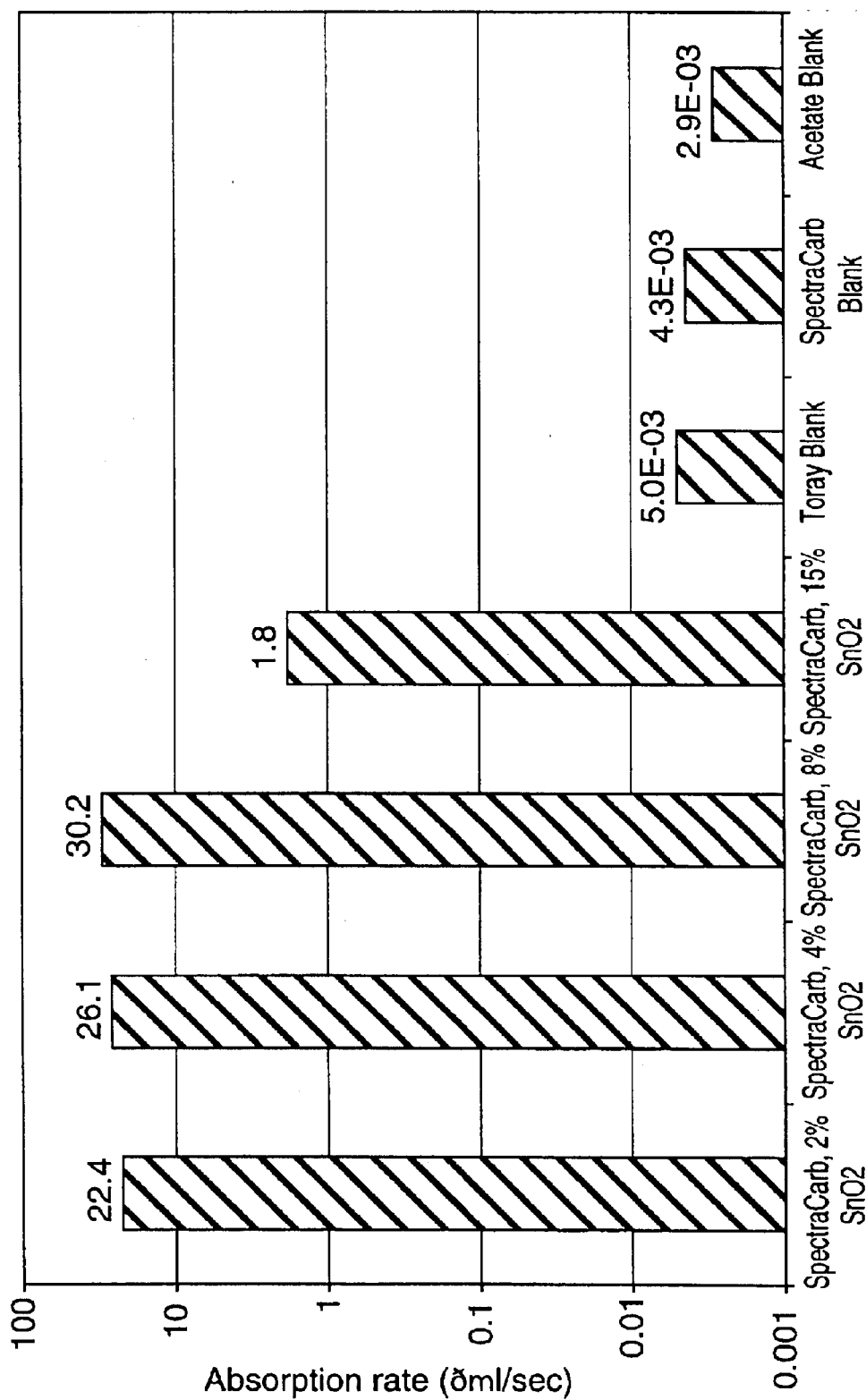
FIG. 5 is a graph disclosing measured rates of water absorption for carbon fiber substrates treated according to the present invention and control substrates.

FIG. 5 demonstrates the resulting data. The rate of water absorption for SpectraCarb Carbon Paper is 3 to 4 orders of magnitude faster after treatment according to the present invention.

Example 5

Figure 6:
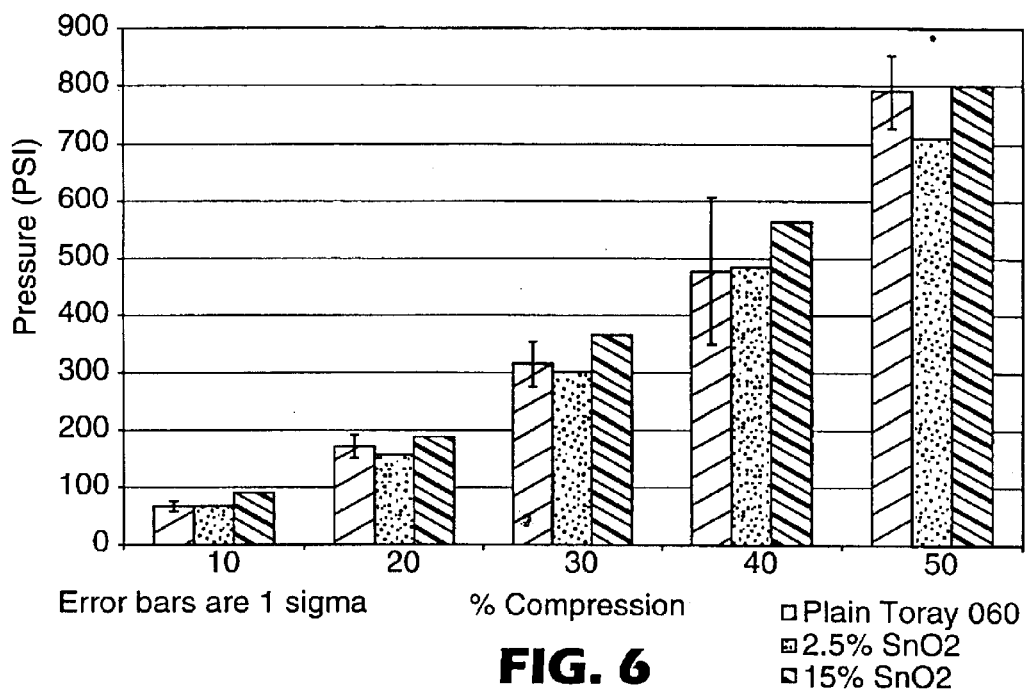
FIG. 6 is a graph of compression vs. pressure for carbon fiber substrates treated according to the present invention and control substrates.
Figure 7:
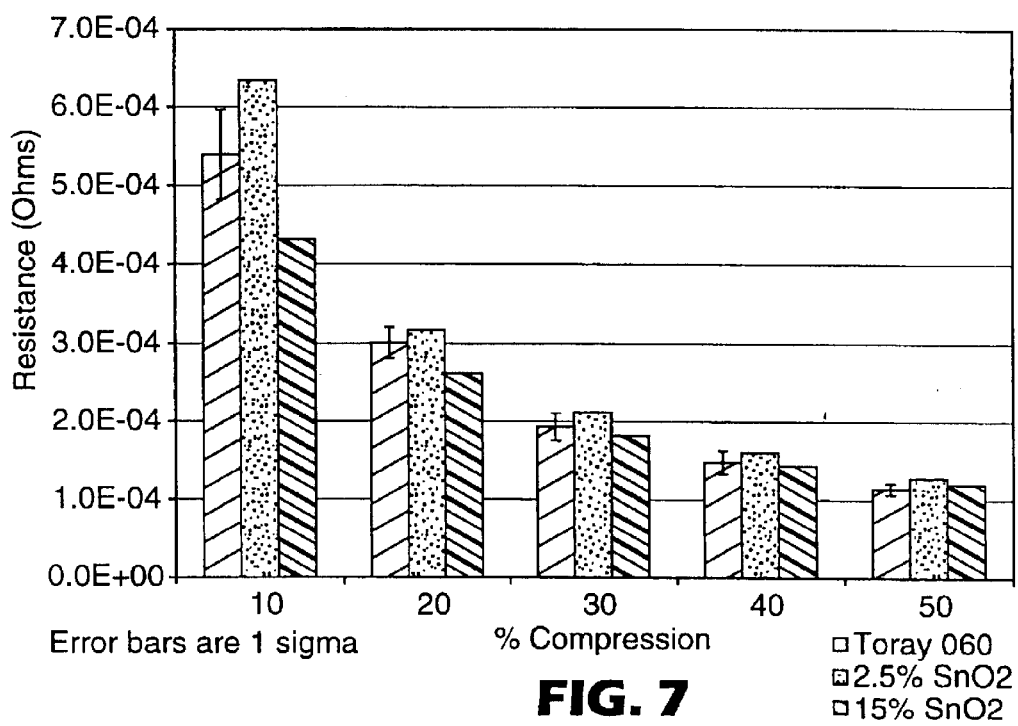
FIG. 7 is a graph of electrical resistivity vs. pressure for carbon fiber substrates treated according to the present invention and control substrates.

Sheets of Toray Carbon Paper 060 were treated as described above with $SnO_2$ dispersions at 2.5 and 15 weight % $SnO_2$. Samples 20.3 cm in diameter were taken of the 2.5 and 15 weight % $SnO_2$ treated Toray as well as untreated Toray Carbon Paper 060. Each sample was tested using a Resistance/Compression Tester comprising a press equipped to compress a sample between two electrically isolated platens so as to allow simultaneous measurement of compression and electrical resistivity at a given pressure. FIG. 6 demonstrates compression vs. pressure data. FIG. 7 demonstrates resistivity vs. pressure data. It can be seen that the treatment according to the invention did not significantly compromise the physical properties of the carbon paper.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a hydrophilic carbon fiber construction comprising the steps of:
   a) immersing a carbon fiber construction in an aqueous dispersion of one or more metal oxides, said aqueous dispersion comprising:
      i) 1–15% by weight metal oxide;
      ii) 0.01%–5% by weight dispersant; and
   b) subsequently heating said carbon fiber construction sufficiently to remove substantially all of said dispersant.

2. The method according to claim 1 wherein said metal oxides are selected from the group consisting of oxides of Sn, Si, Zr, Ti, Al, and Ce.

3. The method according to claim 1 wherein said metal oxide is $SnO_2$.

4. The method according to claim 1 wherein said aqueous dispersion comprises 1–5% by weight metal oxide.

5. The method according to claim 1 wherein said aqueous dispersion comprises 1–3% by weight metal oxide.

6. The method according to claim 1 wherein said aqueous dispersion comprises 1.5–2.5% by weight metal oxide.

7. The method according to claim 3 wherein said aqueous dispersion comprises 1.5–2.5% by weight metal oxide.

8. The method according to claim 1 wherein said carbon fiber construction is selected from the group consisting of woven and non-woven carbon fiber constructions.

9. The method according to claim 3 wherein said carbon fiber construction is selected from the group consisting of woven and non-woven carbon fiber constructions.

10. The method according to claim 1 wherein said dispersant is a non-ionic dispersant.

11. The method according to claim 1 wherein said heating step is accomplished by heating said carbon fiber construction to a temperature of 300° C. or higher for 5 minutes or longer.

12. The method according to claim 1 wherein said immersion step has a duration of not more than 30 minutes.

13. The method according to claim 1 wherein said immersion step has a duration of not more than 10 minutes.

14. The method according to claim 1 wherein said immersion step has a duration of not more than 1 minute.

15. The method according to claim 1 wherein the duration of steps a) and b) is not more than 20 minutes.

16. The method according to claim 11 wherein the duration of steps a) and b) is not more than 20 minutes.

17. The method according to claim 1 wherein said metal oxide comprises particles having a particle size of less than 20 nm.

18. The method according to claim 3 wherein said metal oxide comprises particles having a particle size of less than 20 nm.

19. The method according to claim 7 wherein said metal oxide comprises particles having a particle size of less than 20 nm.

20. The hydrophilic carbon fiber construction made according to the method of claim 1.

21. The hydrophilic carbon fiber construction made according to the method of claim 3.

22. The hydrophilic carbon fiber construction made according to the method of claim 7.

23. The hydrophilic carbon fiber construction made according to the method of claim 19.

24. The hydrophilic carbon fiber construction according to claim 22 having a loading of $SnO_2$ equivalent to 20–50 mg Sn per gram of carbon.

25. The hydrophilic carbon fiber construction according to claim 23 having a loading of $SnO_2$ equivalent to 20–50 mg Sn per gram of carbon.

* * * * *

UNITED STATES PATENT AND TRADEMARK OFFICE
CERTIFICATE OF CORRECTION

PATENT NO. : 6,733,841 B2  Page 1 of 1
APPLICATION NO. : 09/999561
DATED : May 11, 2004
INVENTOR(S) : Joseph W. Frisk It is certified that error appears in the above-identified patent and that said Letters Patent is hereby corrected as shown below:

Column 3
Line 57; "0.01% - 1 %" should read -- 0.01% - 0.1% --

Column 5
Line 22; "100" should read -- 1100 --

Signed and Sealed this

Seventeenth Day of July, 2007

JON W. DUDAS
*Director of the United States Patent and Trademark Office*